(12) United States Patent
Kaplan et al.

(10) Patent No.: US 7,230,250 B2
(45) Date of Patent: Jun. 12, 2007

(54) REAL-TIME SELF-NETWORKING RADIATION DETECTOR APPARATUS

(75) Inventors: Edward Kaplan, Stony Brook, NY (US); James Lemley, Miller Place, NY (US); Thomas Y. Tsang, Holbrook, NY (US); Laurence W. Milian, East Patchogue, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 189 days.

(21) Appl. No.: 10/918,795

(22) Filed: Aug. 16, 2004

(65) Prior Publication Data

US 2006/0033034 A1   Feb. 16, 2006

(51) Int. Cl.
    G01T 3/00    (2006.01)
(52) U.S. Cl. .................................. 250/390.01
(58) Field of Classification Search ............ 250/390.01
    See application file for complete search history.

(56) References Cited

U.S. PATENT DOCUMENTS

| | | | | |
|---|---|---|---|---|
| 4,613,758 | A | * | 9/1986 | Ing et al. ................. 250/474.1 |
| 7,019,640 | B2 | * | 3/2006 | Canich et al. .............. 340/531 |
| 2005/0248456 | A1 | * | 11/2005 | Britton et al. .......... 340/539.29 |
| 2006/0054013 | A1 | * | 3/2006 | Rodney et al. ............ 89/36.02 |

OTHER PUBLICATIONS

Apfel, et al., "Prediction of the Minimum Neutron Energy to Nucleate Vapor Bubbles in Superheated Liquids", The American Physical Society, May 1985, pp. 3194-3198.
d'Errico, et al., "Active Neutron Spectrometry with Superheated Drop (Bubble) Detectors", Radiation Protection Dosimetry, vol. 61, No. 1-3, 1995, pp. 159-162.
Vaijapurkar, et al., "Superheated Liquid Neutron Sensor Based on Polymer Matrix", Radiation Measurements, vol. 24, No. 3, 1995, pp. 309-313.
Ing, H., "Neutron Measurements Using Bubble Detectors—Terrestrial and Space", Radiation Measurements, 33, 2001, pp. 275-286.
Ing, et al., "Bubble Detectors and the Assessment of Biological Risk from Space Radiations", Radiation Protection Dosimetry, vol. 65, Nos. 1-4, 1996, pp. 421-424.
Ing, et al., "Rospec—A Simple Reliable High Resolution Neutron Spectrometer", Radiation Protection Dosimetry, vol. 70, Nos. 1-4, 1997, pp. 273-278.

* cited by examiner

Primary Examiner—David Porta
Assistant Examiner—Christine Sung
(74) Attorney, Agent, or Firm—Lori-Anne Neiger

(57) ABSTRACT

The present invention is for a radiation detector apparatus for detecting radiation sources present in cargo shipments. The invention includes the features of integrating a bubble detector sensitive to neutrons and a GPS system into a miniaturized package that can wirelessly signal the presence of radioactive material in shipping containers. The bubble density would be read out if such indicated a harmful source.

13 Claims, 6 Drawing Sheets

Bubble-Damage Polymer
Detectors for Neutron Dosimetry

REAL-TIME SELF-NETWORKING RADIATION DETECTOR APPARATUS

This invention was made with Government support under contract number DE-AC02-98CH10886, awarded by the U.S. Department of Energy. The Government has certain rights in the invention.

BACKGROUND OF THE INVENTION

1. Field of the Invention

The present invention relates to a radiation detection apparatus, and more particularly to a real-time self-networking radiation detector apparatus for use with cargo shipments.

Cargo vessels (e.g., ships or other vessels) approaching the United States may be carrying nuclear explosive devices, radiological dispersal devices or bulk materials from which such devices could be manufactured after import to the U.S. This apparatus would equip cargo containers of approaching vessels with radiation detection equipment. A friendly vessel could request remote inspection as it approaches port; alternatively inspection could be initiated from a US marine/land-based control center. A shutdown of major ports due to a threat of an attack could result in high costs, particularly for those economies more reliant on trade.

If cargo vessels were inspected only from above the waterline from surface vessels or aircraft, radioactive contraband might be concealed by placing it in the center of the vessel near its bottom. With real-time communications and analysis of data, scans could be repeated to confirm previous findings and reduce false alarms. Radiation measurements would be recorded relative to the position on the ship. The pattern of radiation, particularly if cargo manifest is also available, may further help to distinguish contraband from legitimate cargo that contains traces of radioactive materials, e.g., ceramic tile, potassium-containing fertilizer.

2. Description of the Prior Art

U.S. Pat. No. 4,613,758 to Ing, et al., which is incorporated herein by reference, discloses direct reading detector/dosimeter for neutrons and other high LET radiation is described, comprising a selected, substantially transparent, elastic solid medium uniformly impregnated with droplets of an immiscible detector liquid. The detector liquid-in-solid is appropriately confined and rendered stable for storage by adding a layer of excess detector liquid and sealing in a container. On opening the container and removing the excess detector liquid, the detector liquid droplets become superheated and the detector/dosimeter is activated. Neutrons and other high LET radiation will trigger the vaporization of the superheated droplets and the selected elastic, solid medium will trap the products of vaporization and retain a visual record thereof over an extended time. The number of vaporization events can be counted to give a measure of the radiation dose.

SUMMARY OF THE INVENTION

It is an object of the present invention to provide an ultra-sensitive neutron detector system for integrating the neutron flux inside a transport container over the duration of a voyage to a United States port.

A radiation detector system comprises a plurality of transmitter units each adapted for separate attachment to different cargo containers and each comprising a neutron detector and a readout means. The transmitter unit would also have a communications unit comprising a global positioning system and a wireless communications system. The radiation detector system would also include a receiver station having a central processing unit in communication with and receiving information from the transmitter units, and the communications unit. The transmitter units are portable by land, air and sea transport.

The radiation detector system may also have a logic unit. This logic unit would include a data storage unit, an analog-to-digital converter, a timing unit, a wakeup generator, a readout initiator and a communications interface. The logic unit may have a readout indicator that is in communication with the readout means where an electrical signal is transmitted that is proportional to the neutron flux or if the neutron flux exceeds a preset threshold.

The neutron detector contains dichlorodifluromethane or FREON™ in a polymer gel. A recompression unit would be provided whereby polymer gel is returned to initial condition.

The readout means includes a light source, a light detector that is configured to detect light scattered by bubbles in the polymeric gel and a power supply. The light source is a laser diode. The readout means may include a lock-in amp which provides a signal output to analogue to digital converter or directly to the data storage and communication system. Additionally, there is a status indicator in communication with the readout means via an analog connection to the communications unit.

The global positioning system is operative to generate location of transmitter units when the radiation fluence reaches a user settable alarm level, when asked by bi-directional command to report the detected radiation fluence or at a periodic or predetermined times upon command from the logic unit.

The global positioning system is operative to generate the location at the time of the transmission of a signal from the detector. The central processing unit comprises one of a palm pilot, a laptop and a desktop computer. The central processing unit may be associated with the readout means and readout indicator. The central processing unit being operative to monitor signals sent by the transmitter units, and when comparing the signals against a norm and sending signals to the status indicator indicating high level of radiation. The communications systems may comprise daisy chain capability.

These and other objects, features, and advantages of this invention will become apparent from the following detailed description of illustrative embodiments thereof, which is to be read in connection with the accompanying drawings.

DETAILED DESCRIPTION

Figure 1:
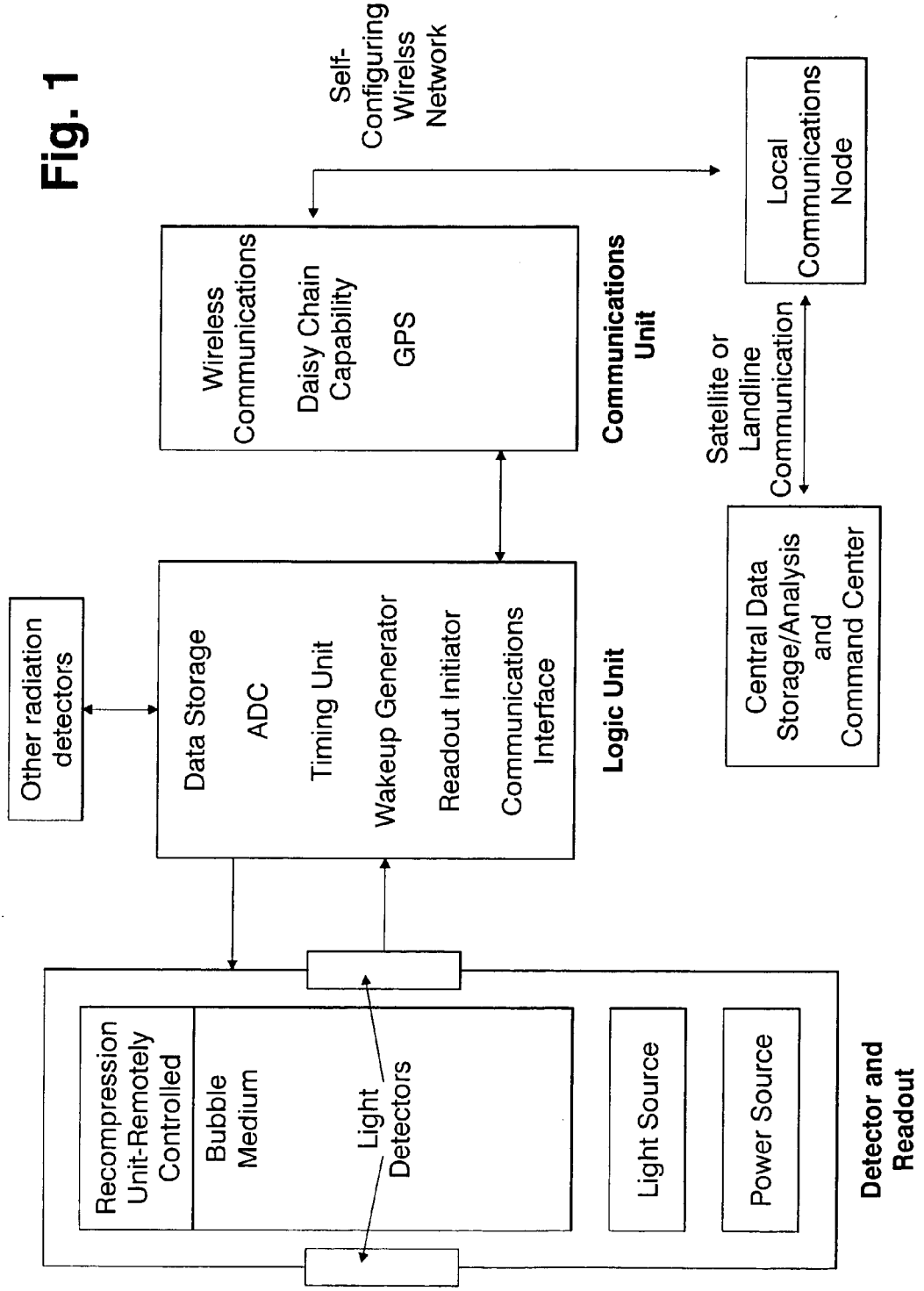
FIG. 1 is a block diagram of a radiation detector system.

The invention includes the features of integrating a bubble detector 22 sensitive to neutrons and a GPS system into a miniaturized package that can signal the presence of radioactive material in shipping containers. FIG. 1 shows a block diagram incorporating all the elements of the neutron detector system. In the preferred embodiment, the radiation detector system comprises a detector 22 and readout means 24, a logic unit, and a communications unit 30 in communication with a central data and command center.

Figure 2:
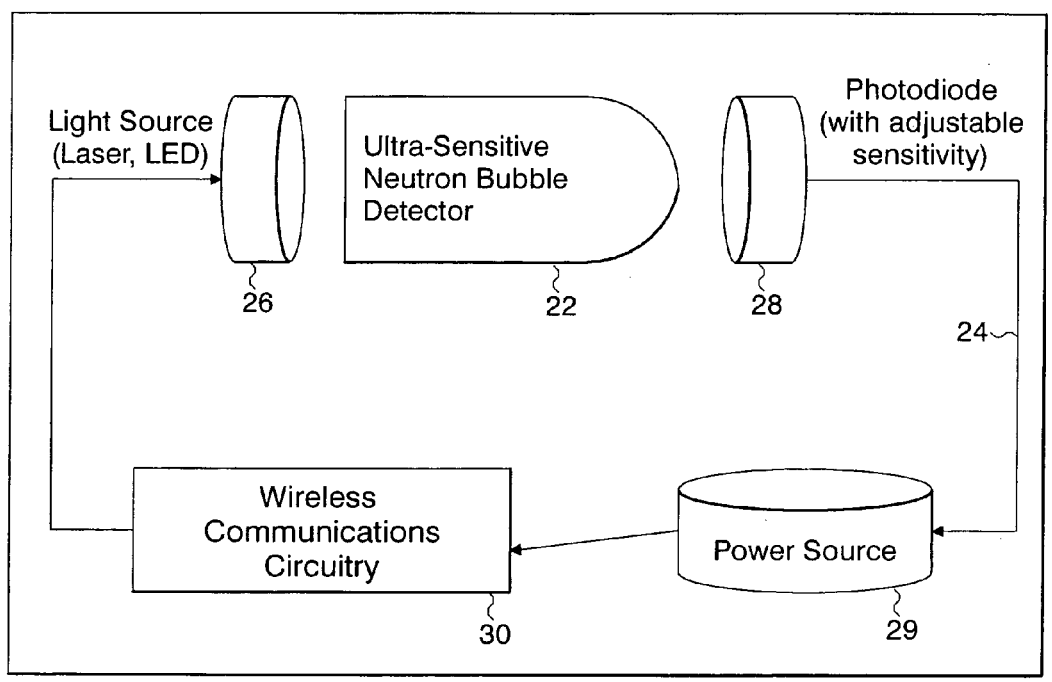
FIG. 2 is a block diagram of the transmitter units.

The radiation detector system would comprise a plurality of transmitter units 20 each adapted for separate attachment to different cargo containers. As shown in FIG. 2, a transmitter unit 20 will comprise a neutron detector 22 and readout means 24. Additionally, there is a communications unit 30 comprising a global positioning system; and a wireless communications system.

When a cosmic ray interacts with the dense structural material of a ship, it creates multiple neutrons, but the average neutron flux is extremely low. In contrast to gamma rays, neutrons are not associated with naturally occurring radioactive materials likely to be found either in structural materials or in the cargos routinely carried in containers. Any steady neutron flux is due either to (alpha, n) neutrons associated with an alpha-emitting nuclei or to spontaneous fission of an actinide element. Thus, any neutron flux significantly over background very likely is cause for concern. If the neutron flux in a transport container is integrated over the duration of a multi-day voyage to a U.S. port, an extremely weak neutron source could be detected before the ship reaches US waters. Since fast neutrons created by spontaneous fission are difficult to shield and have considerable range, an integrating neutron detector sensitive to fast neutrons might be able to detect a neutron source within the same container or in a nearby container. If all or many of the containers on the ship were equipped with integrating neutron detectors, a pattern consisting of unusually high fluence detected in adjacent containers would be a signature with very low false alarm probability.

Figure 4:
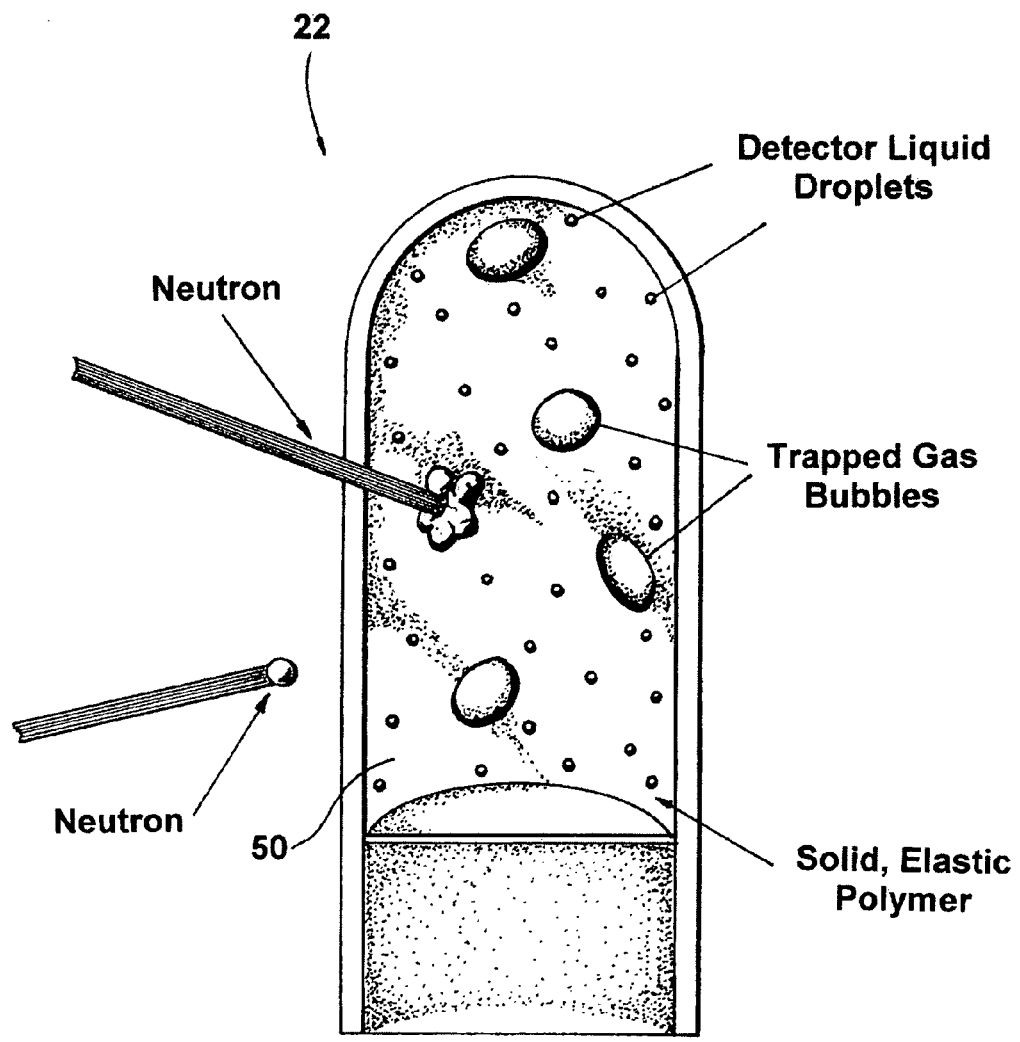
FIG. 4 is a view of the neutron detector.
Figure 5:
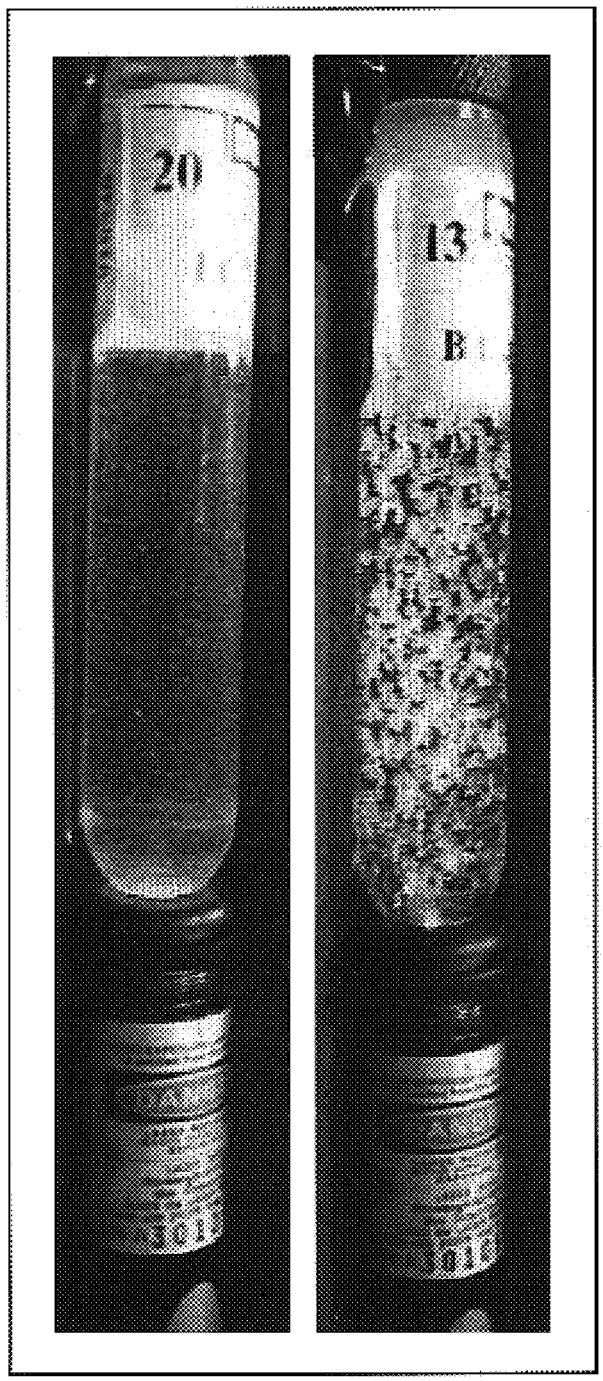
FIG. 5 is a pictorial view of the neutron detectors.

As shown in FIG. 4 bubble detectors contain microscopic liquid drops suspended in a gel-like material 50. Incoming neutrons transfer enough energy to the liquid drops, directly or via other interaction, to make them suddenly vaporize and change into a bubble. Each collision produces only one bubble. These bubbles are visible to the eye and can be counted. The actual neutron dose is proportional to the density of bubbles, and these remain fixed in the material until the dosimeter is reset. Additionally, bubble detectors are insensitive to x-ray and gamma ray background. More complex "liquid" bubble detectors are expected to have efficiencies of ~1% (versus 0.001% for gel-type) while maintaining the desirable characteristics of the gel-type units. In the preferred embodiment, the bubble detector may be as described in U.S. Pat. No. 4,613,758 incorporated herein by reference.

The most sensitive medium available for detection of neutrons is a transparent polymer containing microscopic superheated bubbles of liquid dichlorodifluromethane or Freen FREON™. These bubble detectors are commercially available equipment. When struck by a neutron, a droplet vaporizes forming a large bubble visible to the naked eye. Bubble detectors are also available in sizes; a larger detector has a sensitivity of 5000 bubbles/milliRem.

Figure 6:
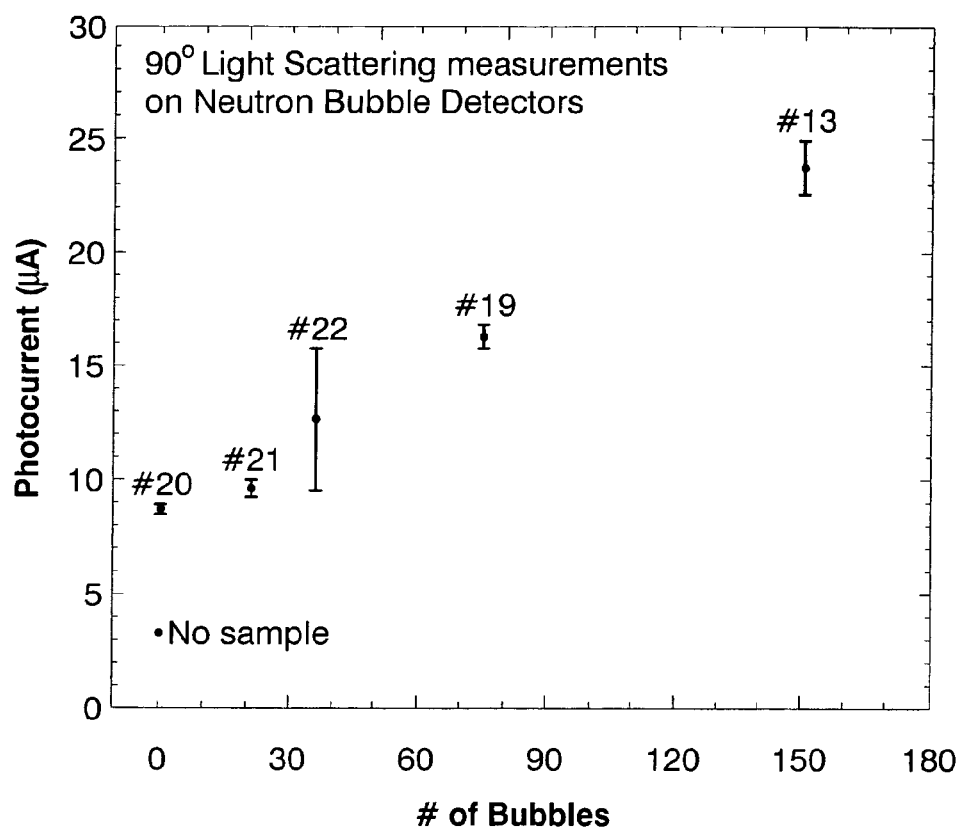
FIG. 6 is a graph of 90-degree light scattering measurements on detectors.

As shown in FIG. 6, the intensity of the scattered light is proportional to the number of bubbles or the number of bubbles is proportional to the neutron fluence. The invention includes an optical technique to electronically read these commercially available detectors, where the number of bubbles is proportional to the detector's exposure to neutrons (200 Kev to 10 Mev).

Figure 3:
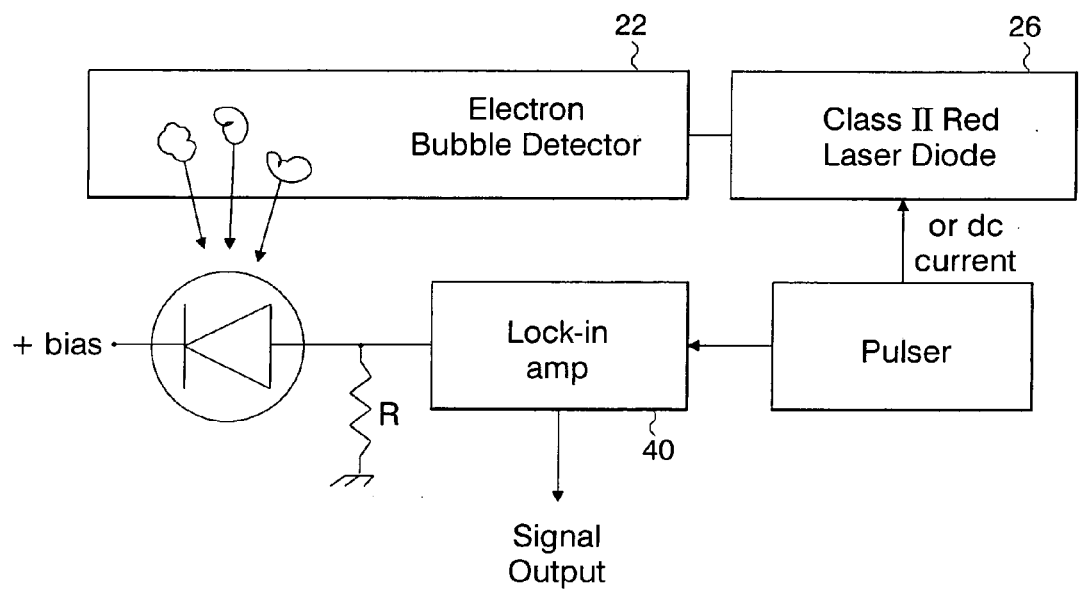
FIG. 3 is a block diagram of the readout means, which includes the circuit diagram.

As shown in FIG. 3 electronics would read out the bubble density. The readout means 24 includes a light source 26, at least one light detector 28 that is configured to detect light scattered by bubbles in the polymeric gel 50 and a power supply 29. In the preferred embodiment, the light source 26 is a laser diode.

The readout means 24 includes electronic readout for neutron detectors 22 that measures light from a diode laser that is scattered by the bubbles When the number of bubbles exceeds the useful detection range, the bubble medium can be regenerated by mechanical compression, which collapses the bubbles by re-liquefying the dichlorodifluromethane or FREON™. Since neutron background, due primarily to interaction of cosmic rays with the ship's structure, is expected to be extremely low, the detectors 22 could be recompressed between inspections. Alternatively several detectors 22 could be installed and recompressed sequentially so that the detection system would operate continuously.

The readout means includes a lock-in amp 40 which provides a signal output to analogue to digital converter or directly to the data storage and communication unit 30.

The communications unit 30 comprises a global positioning system and a wireless communications system. The global positioning system is operative to generate location at the time of the transmission of a signal from the detector 22. The communications unit further comprises daisy chain capability.

The central processing unit is associated with the readout means 24 and readout indicator. The central processing unit being operative to monitor signals sent by the transmitter units 20, and where comparing said signals against a norm and sending signals to said status indicator indicating high level of radiation. The central processing unit may comprise at least one of a palm pilot, a laptop and a desktop computer. The central processing unit may be located in any location where it would be useful for the user to obtain the data. This location may be but is not limited to onboard a cargo ship, on an airplane or on land.

In an alternative embodiment, the communication systems would be a commercially available technology that has been developed for real-time asset tracking in commercial businesses (e.g., warehouses, trucking, railroads, etc.). The system is called Container Security Technology, Class Based Asset Tracking (CBAT), and is based upon a self-forming, low cost, low-power, highly secure wireless network utilizing low power radios, radio-frequency identification (RFID) and Real-Time Locating Systems (RTLS) tags. The system can be powered by batteries or from other power. CBAT performs three important security functions: access control, asset tracking and container security. It conducts these functions in real time, simultaneously and independent of the number of secure areas or portals, assets to be tracked, or containers to be managed. The use of the patent-pending CBAT technology [or any similar technology] also provides major improvements in the management of site assets by tracking and managing inventories of equipment, tools, pallets, shipments, etc.

The logic unit comprises a data storage unit, an analog-to-digital converter, a timing unit, a wakeup generator, a readout initiator, and a communications interface. The readout indicator is in communication with the readout means 24 via an analog connection to the communications unit. The global positioning system is operative to generate location of transmitter units 20 when the radiation fluence reaches a user settable alarm level, when asked by bi-directional command to report the detected radiation fluence or at a periodic or predetermined times upon command from the logic unit.

The transmitter units 20 are portable by land, air and sea transport. By varying the size and configuration of the bubble detector, a full spectrum of applications will be covered including (1) a pocket detector for continuous surveillance by authorities, (2) a handheld detector for personal and vehicle inspections, (3) a fixed-installation detector for border checkpoints, buildings, or rapid cargo container monitoring, or (4) an installed component in emergency or public service vehicles (e.g., police cars, municipal buses, subway cars). Upon detection of a neutron source the detection system will, depending on the operating mode, sound an immediate alarm and/or transmit its location and neutron signal to a remote database and data analysis center via wireless or other modes of communication (e.g., land lines). Data can be displayed remotely via the worldwide web, which can also be used to communicate back to the detection system. The detection system will maintain knowledge of its location and sensor readings such that communication will be restored immediately after loss of satellite GPS signals. The detection system platform will be capable of incorporating other sensor modules (e.g., gamma, chemical, biological, explosive). A network system will be developed to handle data from a few users to a few hundred thousand users.

Although the invention is described herein with reference to the preferred embodiment, one skilled in the art will readily appreciate that other embodiments may be substituted for those set forth herein without departing from the spirit and scope of the present invention. As such, the described embodiments are not intended to be exhaustive or to limit the invention to the precise forms disclosed, and obviously many modifications and variations are possible in light of the above teaching. The embodiments were chosen and described in order to best explain the principles of the invention and its practical application. It is intended that the scope of the invention be defined by the claims appended hereto and their equivalents.

The invention claimed is:

1. A radiation detector system comprising:
   a plurality of transmitter units each adapted for separate attachment to different cargo containers and each comprising:
      a neutron detector containing dichlorodifluromethane in a polymer gel; and
   a readout means comprising:
   a light source;
   at least one light detector that is configured to detect light scattered by bubbles in the polymeric gel;
   and a power supply;
   a communications unit comprising:
   a global positioning system; and
   a wireless communications system; and
   a receiver station having
   a central processing unit in communication with and receiving information from said transmitter units, and said communications unit.

2. The radiation detector system of claim 1 further comprising a logic unit comprising:
   a data storage unit;
   an analog-to-digital converter;
   a timing unit;
   a wakeup generator;
   a readout initiator; and
   a communications interface.

3. The radiation detector system of claim 1 further comprising a recompression unit whereby polymer gel is returned to initial condition.

4. The logic unit of claim 2 wherein said readout indicator is in communication with said readout means via an analog connection to the communications unit.

5. The logic unit as of claim 2 wherein said readout indicator is in communication with said readout means where an electrical signal is transmitted that is proportional to the neutron flux or if the neutron flux exceeds a preset threshold.

6. The radiation detector system of claim 2 where said global positioning system is operative to generate location of transmitter units when the radiation fluence reaches a user settable alarm level, when asked by bi-directional command to report the detected radiation fluence or a periodic or predetermined times upon command from the logic unit.

7. The radiation detector system of claim 2 wherein said central processing unit comprises one of a palm pilot, a laptop and a desktop computer.

8. The radiation detector system of claim 2 including a central processing unit associated with said readout means and readout indicator, said central processing unit being operative to monitor signals sent by said transmitter units, and where comparing said signals against a norm and sending signals to said status indicator indicating high level of radiation.

9. The radiation detector system of claim 1 wherein light source is a laser diode.

10. The radiation detector system of claim 1 wherein readout means includes:
   a lock-in amp which provides a signal output to analogue to digital converter or directly to the data storage and communication system.

11. The global positioning system of claim 1 is operative to generate location at the time of the transmission of a signal from the detector.

12. The communications unit as defined of claim 1 further comprising daisy chain capability.

13. The radiation detector system of claim 1 wherein said transmitter units are portable by land, air and sea transport.

* * * * *